(12) United States Patent
Jung et al.

(10) Patent No.: US 11,888,813 B2
(45) Date of Patent: Jan. 30, 2024

(54) METHOD AND SYSTEM FOR INITIAL SETUP OF ENERGY STORAGE SYSTEM

(71) Applicant: Hanwha Solutions Corporation, Seoul (KR)

(72) Inventors: Ji Seok Jung, Seoul (KR); Eun Cheol Ro, Seoul (KR); Seung Hyeok Jang, Seoul (KR)

(73) Assignee: HANWHA SOLUTIONS CORPORATION, Seoul (KR)

(*) Notice: Subject to any disclaimer, the term of this patent is extended or adjusted under 35 U.S.C. 154(b) by 124 days.

(21) Appl. No.: 17/531,589

(22) Filed: Nov. 19, 2021

(65) Prior Publication Data
US 2022/0285953 A1 Sep. 8, 2022

(30) Foreign Application Priority Data
Sep. 21, 2020 (KR) ........................ 10-2020-0121686

(51) Int. Cl.
H04L 61/5038 (2022.01)
G06F 13/38 (2006.01)
(Continued)

(52) U.S. Cl.
CPC ........ *H04L 61/5038* (2022.05); *G06F 13/382* (2013.01); *G06F 13/4282* (2013.01);
(Continued)

(58) Field of Classification Search
CPC .... G06F 3/1231; G06F 9/4411; G06F 15/177; G06F 13/382; G06F 13/385;
(Continued)

(56) References Cited

U.S. PATENT DOCUMENTS

2008/0126653 A1    5/2008  King et al.
2010/0267368 A1*  10/2010  Masputra .......... H04M 1/72445
                                                        455/414.1
(Continued)

FOREIGN PATENT DOCUMENTS

JP    2001-274798 A    10/2001
JP    2010-117855 A     5/2010
(Continued)

OTHER PUBLICATIONS

"Comparing a Dynamic vs Static IP". KeyCDN. Online Oct. 4, 2018. Retrieved from Internet May 18, 2023. <https://www.keycdn.com/support/dynamic-vs-static-ip>. (Year: 2018).*
(Continued)

*Primary Examiner* — Thomas J. Cleary
(74) *Attorney, Agent, or Firm* — Knobbe, Martens, Olson & Bear, LLP

(57) ABSTRACT

A method for initial setup of an energy storage system suitable for an installation environment when installing the energy storage system comprises: connecting an energy management system and a user terminal with a USB cable; activating, by the user terminal, a USB network through USB tethering; allocating, by the energy management system, a preset static IP to the USB network; accessing, by the user terminal, a setting server of the energy management system using the static IP; and performing, by the user terminal, initial setup of the energy storage system in the setting server.

7 Claims, 4 Drawing Sheets (a)

(b)

(51) Int. Cl.
*G06F 13/42* (2006.01)
*G06F 15/177* (2006.01)
*H04L 61/5007* (2022.01)
*H04L 61/00* (2022.01)
*H04L 41/0806* (2022.01)
*H02J 7/00* (2006.01)
*H04L 12/10* (2006.01)

(52) U.S. Cl.
CPC ........ *G06F 15/177* (2013.01); *H04L 41/0806* (2013.01); *H04L 61/35* (2013.01); *H04L 61/5007* (2022.05); *G06F 2213/0042* (2013.01); *G06F 2213/0052* (2013.01); *H02J 7/00032* (2020.01); *H04L 12/10* (2013.01)

(58) Field of Classification Search
CPC ............. G06F 13/4004; G06F 13/4027; G06F 13/4063; G06F 13/4282; G06F 2213/0042; G06F 2213/0052; H02J 7/00032; H02J 3/32; H04L 12/10; H04L 41/08; H04L 41/0803; H04L 41/0806; H04L 61/35; H04L 61/5007; H04L 61/5038
See application file for complete search history.

(56) References Cited

U.S. PATENT DOCUMENTS

| | | | | |
|---|---|---|---|---|
| 2011/0179203 | A1* | 7/2011 | Galloway | G06F 16/176 710/74 |
| 2018/0240333 | A1* | 8/2018 | Meermann | B62M 6/45 |
| 2018/0295105 | A1* | 10/2018 | Feng | H04L 9/3226 |
| 2022/0311737 | A1* | 9/2022 | Lee | H04L 61/5007 |

FOREIGN PATENT DOCUMENTS

| | | |
|---|---|---|
| KR | 10-1954889 B1 | 3/2019 |
| KR | 10-2020-0070930 A | 6/2020 |

OTHER PUBLICATIONS

Anonymous: "SEGGER: IP-over-USB technology enables easy web browser access for USB devices | Business Hire", Aug. 2, 2017 (Aug. 2, 2017), XP055919268.

Extended European Search Report dated Jun. 1, 2022 of the corresponding European Patent Application No. 21211683.4.

* cited by examiner

METHOD AND SYSTEM FOR INITIAL SETUP OF ENERGY STORAGE SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to a method and system for initial setup of an energy storage system.

BACKGROUND ART

In general, an Energy Storage System (ESS) is a system for improving energy use efficiency, improving the quality of renewable energy, and stabilizing a power supply system by storing power and using it when needed.

This energy storage system is a system that stabilizes the irregular power of new and renewable energy, and improves energy efficiency and improves the stable operation of the power system by storing power when the demand for power is low and using the stored power during times of high consumption, to minimize the restrictions on power transmission to increase the utilization of new and renewable energy.

Types of energy storage systems include for peak reduction, for emergency power, for solar-connected use, and for frequency adjustment.

An energy storage system may include an Energy Management System (EMS) for receiving information from peripheral devices and monitoring in real time as a system that manages power, including functions capable of monitoring and regulating energy consumption in the energy storage system, and predicting power use and making adjustments.

When installing the energy storage system, the installer performs initial setup of the energy storage system according to each installation environment. To this end, the installer connects a user terminal to the energy management system and performs initial setup.

The conventional methods for initial setup of the energy storage system include a method of performing initial setup by connecting the user terminal and the energy management system by wire through an Ethernet cable, and a method of performing initial setup by wirelessly connecting the user terminal and the energy management system through Wi-Fi and Bluetooth (BT) communication.

As such, in the first method of the conventional methods for initial setup of the energy storage system, it is cumbersome for the installer to manually align the IP address range of the user terminal with the IP address range of the energy management system, and a specific application for performing initial setup should be installed in the user terminal.

In addition, in the second method of the conventional methods for initial setup of the energy storage system, since it is a wireless communication method, the connection may be unstable depending on the distance, there is a problem of weak security, and, like the first method, a specific application for performing initial setup should be installed in the user terminal.

The disclosure of this section is to provide background information relating to the present disclosure. Applicant does not admit that any information contained in this section constitutes prior art.

PRIOR ART REFERENCE

Patent Publication

Korean Patent No. 10-1954889

SUMMARY

One aspect of the present invention is directed to providing a system and method in which there is no need to install a separate initial setup application in a user terminal at the time of initial setup, as well as the hassle of manually matching the IP address range of the user terminal with the IP address range of an energy management system for initial setup can be eliminated.

In addition, another aspect of the present invention is directed to providing a system and method capable of performing initial setup using user terminals having various operating systems.

One aspect of the present invention provides a method for initial setup of an energy storage system suitable for an installation environment when installing the energy storage system, the method comprising connecting an energy management system and a user terminal with a Universal Serial Bus (USB) cable; activating, by the user terminal, a USB network through USB tethering; allocating, by the energy management system, a preset static IP to the USB network; accessing, by the user terminal, a setting server of the energy management system using the static IP; and performing, by the user terminal, initial setup of the energy storage system in the setting server.

Here, the accessing the setting server is a step of accessing the setting server by inputting the static IP to an address bar of a web browser of the user terminal.

In addition, the method for initial setup of an energy storage system according to an example embodiment of the present invention further include, before performing the initial setup, a step of providing, by the setting server, an interface for performing the initial setup to the user terminal.

In addition, the method for initial setup of an energy storage system according to an example embodiment of the present invention further include setting, by the energy management system, the static IP differently according to an operating system of the user terminal.

Here, the allocating the static IP is a step of selectively allocating, by the energy management system, the different static IPs to the different USB networks.

In addition, the accessing the setting server is a step of accessing, by the user terminal, the setting server with the static IP suitable for the operating system of the user terminal.

In addition, one aspect of the present invention provides a system for initial setup of an energy storage system, comprising an energy management system comprising a setting server for performing initial setup suitable for an installation environment when installing the energy storage system, and a controller for allocating a preset static IP to a USB network; and a user terminal connected to the energy management system through a USB cable and for activating the USB network through USB tethering; wherein the user terminal accesses the setting server of the energy management system with the static IP and performs initial setup of the energy storage system in the setting server.

Here, when the static IP is input to an address bar of a web browser of the user terminal, the user terminal accesses the setting server.

In addition, the controller sets the static IP differently according to an operating system of the user terminal.

In addition, the controller selectively allocates the different static IPs to different USB networks according to the operating system of the user terminal.

In addition, the user terminal accesses the setting server with the static IP suitable for the operating system of the user terminal.

According to embodiments of the present invention, there is no need to install a separate initial setup application in a user terminal at the time of initial setup, as well as the hassle of manually matching the IP address range of the user terminal with the IP address range of an energy management system for initial setup can be eliminated.

In addition, according to embodiments of the present invention, it is possible to perform initial setup by using the user terminal having various operating systems.

The effects of embodiments of the present invention are not limited to those mentioned above, and other effects not mentioned will be clearly understood by those of ordinary skill in the art from the following description.

DETAILED DESCRIPTION OF EXAMPLE EMBODIMENTS

Hereinafter, in order to fully understand the configuration and effects of the present invention, example embodiments of the present invention will be described with reference to the accompanying drawings. However, the present invention is not limited to the embodiments disclosed below, and may be embodied in various forms and various modifications may be made. Rather, the description of the present invention is provided so that this disclosure will be thorough and complete and will fully convey the concept of the invention to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present invention, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present invention may be interpreted as meanings commonly known to those of ordinary skill in the art.

Figure 1:
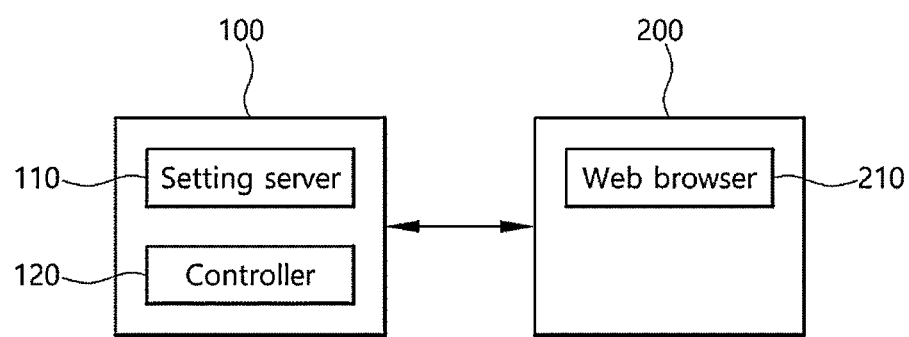
FIG. 1 is a schematic block diagram of a system for initial setup of an energy storage system according to an example embodiment of the present invention.
Figure 2:
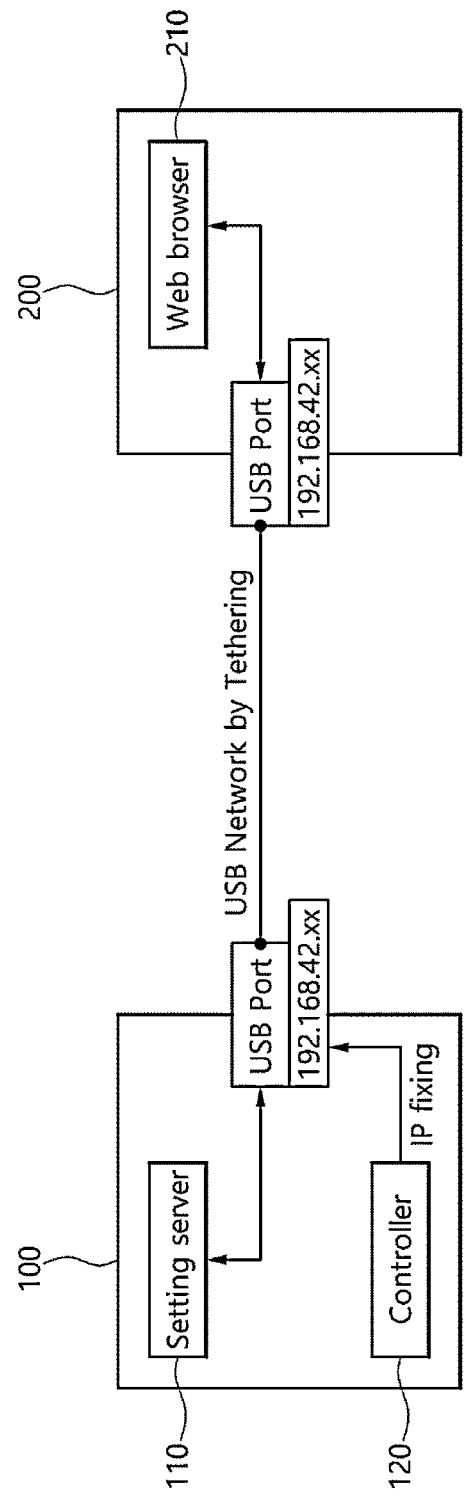
FIG. 2 is an operation configuration diagram of a system for initial setup of an energy storage system according to a first embodiment of the present invention.
Figure 3:
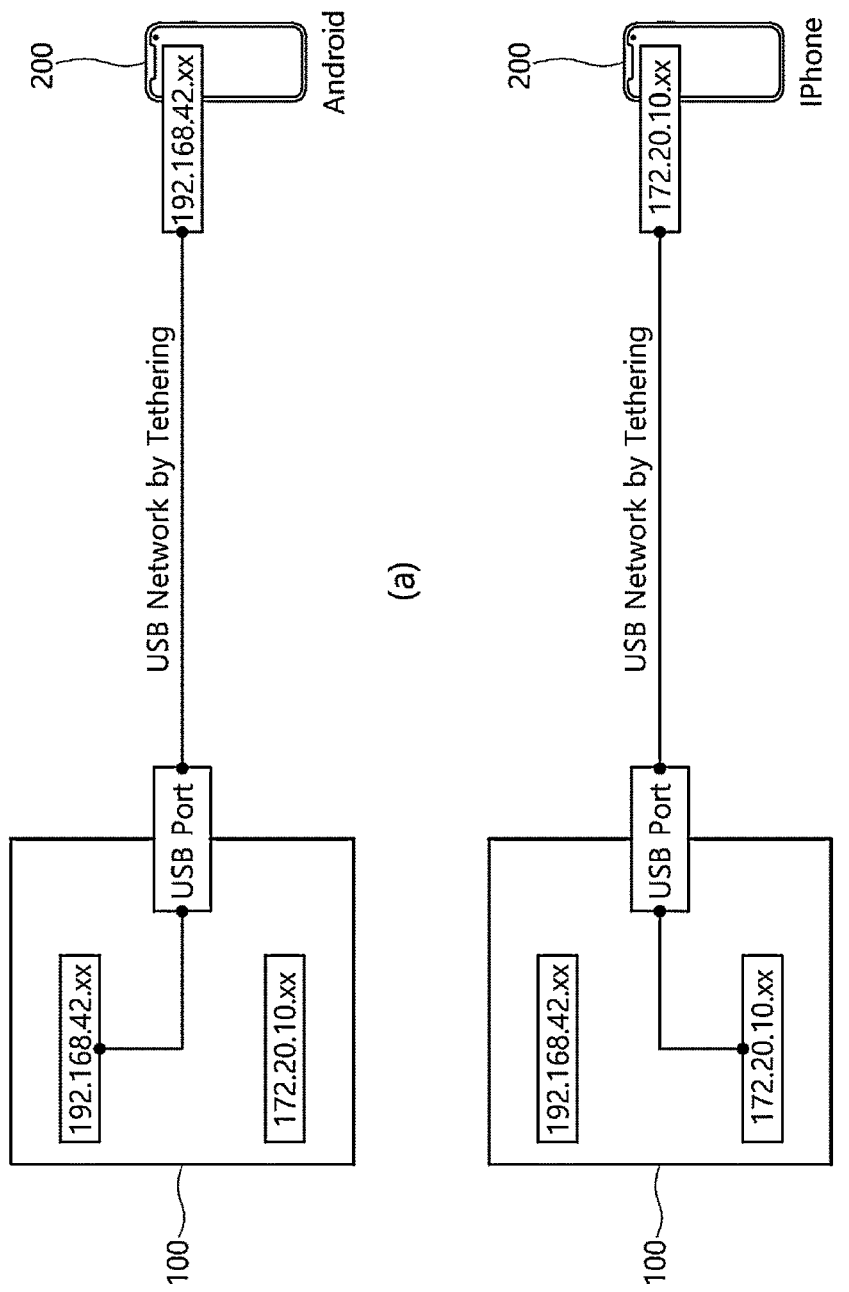
FIG. 3 shows operation configuration diagrams of a system for initial setup of an energy storage system according to a second embodiment of the present invention.

FIG. 1 is a schematic block diagram of a system for initial setup of an energy storage system according to an example embodiment of the present invention, FIG. 2 is an operation configuration diagram of a system for initial setup of an energy storage system according to a first embodiment of the present invention, and FIG. 3 shows operation configuration diagrams of a system for initial setup of an energy storage system according to a second embodiment of the present invention.

As shown in FIG. 1, the system for initial setup of an energy storage system according to an example embodiment of the present invention may include an energy management system 100 and a user terminal 200.

An energy storage system (ESS) is a system that increases energy efficiency by storing generated electricity in a storage device (battery, etc.) and supplying it when power is needed.

The energy management system (EMS) 100 is a system that provides data on the operation status and power consumption of the energy storage system to the manager, so that the manager can monitor the energy storage system.

As such, the energy management system 100 may be provided in the energy storage system, but is not limited thereto.

When installing the energy storage system, the installer performs initial setup of the energy storage system according to each installation environment. To this end, the installer connects the user terminal 200 to the energy management system 100 and performs initial setup.

The energy management system 100 may include a setting server 110 for performing initial setup suitable for an installation environment when installing the energy storage system, and a controller 120 for allocating a preset static IP to a USB network. Here, the setting server 110 is a type of web server and provides an interface for performing initial setup.

A web browser 210 for accessing the setting server 110 of the energy management system 100 may be installed in the user terminal 200. Here, the user terminal 200 may be a mobile terminal such as a mobile phone or a notebook computer, but is not limited thereto, and any mobile terminal capable of performing a tethering function is sufficient.

Hereinafter, an operation process of the system for initial setup of an energy storage system according to a first embodiment of the present invention will be described with reference to FIG. 2.

The user terminal 200 is connected to the energy management system 100 through a USB cable. Here, the energy management system 100 and the user terminal 200 have a USB port for connecting a USB cable.

When the user terminal 200 is connected to the energy management system 100, the user terminal 200 may activate the USB network through USB tethering. To this end, tethering software is installed in the user terminal 200 to enable Internet access through a USB cable.

Here, tethering refers to an Internet sharing method that enables an external device to use the Internet by connecting a device capable of using the Internet with another external device.

The user terminal 200 accesses the setting server 110 of the energy management system 100 with a static IP. Specifically, the installer may access the setting server 110 by inputting a static IP known or designated by the user to the address bar of the web browser of the user terminal 200.

As such, in the system for initial setup of an energy storage system according to the first embodiment of the present invention, there is no need to install a separate initial setup application in the user terminal 200 at the time of initial setup, as well as the hassle of manually matching the IP address range of the user terminal 200 with the IP address range of the energy management system 200 for initial setup can be eliminated.

The user terminal 100 may perform initial setup of the energy storage system using an interface for initial setup provided by the setting server 110. That is, the user terminal 200 displays an interface for initial setup provided by the setting server 110 on the display screen of the user terminal 200 so that the installer can perform initial setup.

As such, in the system for initial setup of an energy storage system according to the first embodiment of the present invention, the user terminal 200 directly performs the initial setup by accessing the setting server 110, rather than as in the conventional method transmitting the initial setup data to the setting server 110 and the setting server 110 performing the initial setup based on the initial setup data.

Hereinafter, an operation process of the system for initial setup of an energy storage system according to a second embodiment of the present invention will be described with reference to FIG. 3.

The system for initial setup of an energy storage system according to the second embodiment of the present invention differs only in the configuration for setting and allocating the static IP, and the rest of the configuration is the same.

The user terminal 200 may use a different operating system (e.g., Android, iOS, etc.) for each type. Further, in the case of USB tethering, the IP address range is different depending on the type of operating system.

Accordingly, the system for initial setup of an energy storage system according to the second embodiment of the present invention presents a method for performing the initial setup by changing the static IP according to the operating system of the user terminal 200.

Specifically, the controller 120 sets the static IP differently according to the operating system of the user terminal 200 by using the IP alias. Here, IP alias is a method of setting a plurality of IPs in one physical network interface card.

For example, the controller 120 may set the static IP to 192.168.42.xx when the operating system of the user terminal 200 is Android, and may set the static IP to 172.20.10.xx when the operating system of the user terminal 200 is iOS.

The controller 120 may selectively allocate different static IPs to different USB networks according to the operating system of the user terminal 200 connected to the energy management system 100.

For example, as shown in (a) of FIG. 3, when the user terminal 200 having an Android operating system is connected to the energy management system 100, the controller 120 may allocate 192.168.42.xx to the USB network. As shown in (b) of FIG. 3, when the user terminal 200 having an iOS operating system is connected to the energy management system 100, the controller 120 may allocate 172.20.10.xx to the USB network.

The user terminal 200 may access the setting server 110 with a static IP suitable for the operating system of the user terminal 200.

For example, as shown in (a) of FIG. 3, the user terminal 200 of which the operating system is Android may access the setting server 110 at 192.168.42.xx. As shown in (b) of FIG. 3, the user terminal 200 of which the operating system is iOS may access the setting server 110 at 172.20.10.xx.

The user terminal 200 accesses the setting server 110 of the energy management system 100 with a fixed IP suitable for the operating system. Specifically, the installer may access the setting server 110 by inputting a static IP known or designated by the user to the address bar of the web browser of the user terminal 200.

As such, the system for initial setup of an energy storage system according to the second embodiment of the present invention may perform initial setup by using the user terminal 200 having various operating systems.

Figure 4:
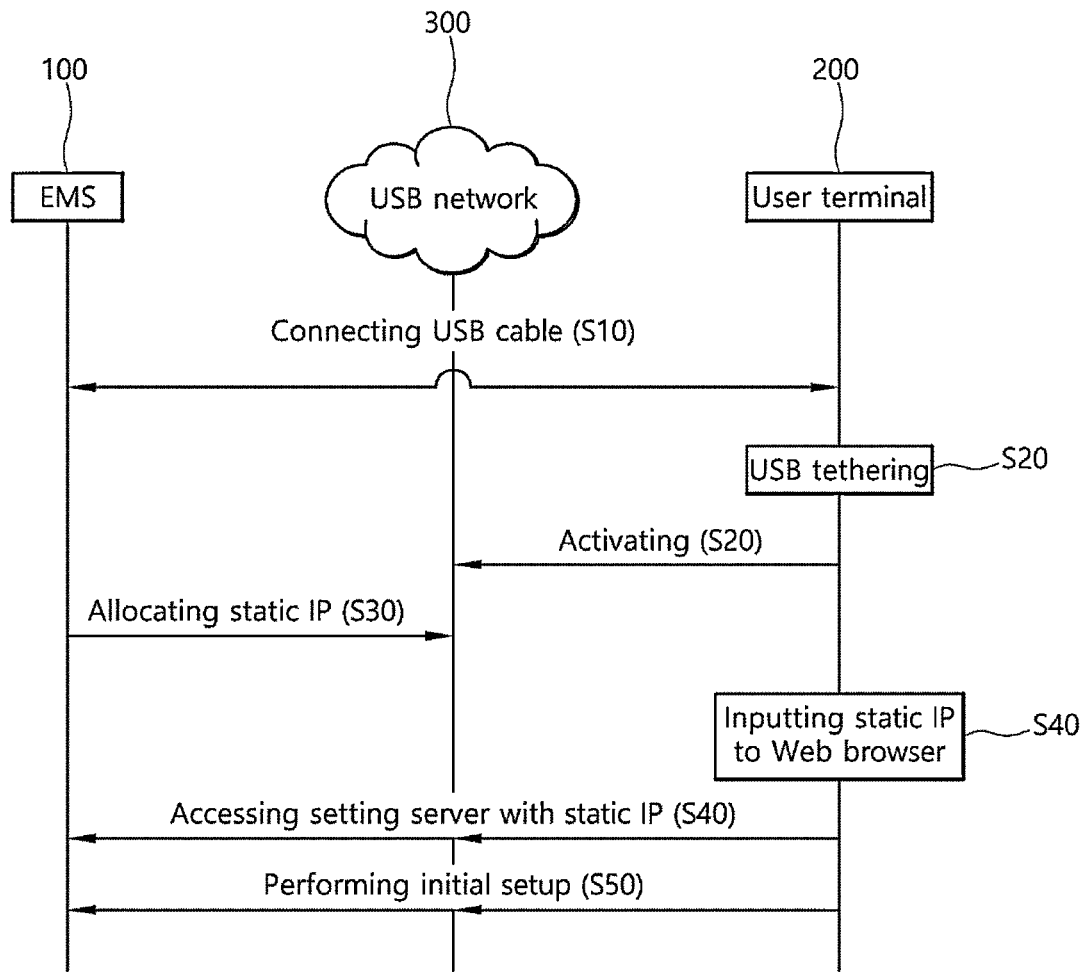
FIG. 4 is a flowchart of a method for initial setup of an energy storage system according to an example embodiment of the present invention.

FIG. 4 is a flowchart of a method for initial setup of an energy storage system according to an example embodiment of the present invention.

Hereinafter, a method for initial setup of an energy storage system according to an example embodiment of the present invention will be described with reference to FIGS. 1 to 4.

First, the energy management system 100 and the user terminal 200 are connected with a USB cable at step S10, and the user terminal 200 activates the USB network 300 through USB tethering at step S20.

Next, the energy management system 100 allocates a preset static IP to the USB network 300 at step S30.

Next, the user terminal 200 accesses the setting server 110 of the energy management system 100 with a static IP at step S40.

Next, the user terminal 200 performs the initial setup of the energy storage system in the setting server 110 at step S50.

The step S50 of accessing the setting server 110 by the user terminal 200 may be a step of accessing the setting server 110 by inputting a static IP known or designated by the user to the address bar of the web browser 210 of the user terminal 200.

The method for initial setup of an energy storage system according to an example embodiment of the present invention may include, before the step S50 of performing the initial setup by the user terminal 200, a step of providing, by the setting server, an interface for performing the initial setup to the user terminal 200.

The method for initial setup of an energy storage system according to an example embodiment of the present invention may include a step of setting, by the energy management system 100, the static IP differently according to the operating system of the user terminal 200.

Here, the step S30 of allocating the static IP by the energy management system 100 may be a step of selectively allocating, by the energy management system 100, different static IPs to different USB networks 300.

The step S40 of accessing the setting server 110 by the user terminal 200 may be a step of accessing, by the user terminal 200, the setting server 210 with a static IP suitable for the operating system of the user terminal 200.

As such, in the method for initial setup of an energy storage system according to an example embodiment of the present invention, there is no need to install a separate initial setup application in the user terminal 200 at the time of initial setup, as well as the hassle of manually matching the IP band of the user terminal 200 with the IP band of the energy management system 200 for initial setup can be eliminated.

In addition, the method for initial setup of an energy storage system according to an example embodiment of the present invention may perform initial setup by using the user terminal 200 having various operating systems.

In the detailed description, although embodiments have been described, it is apparent that various modifications are possible without departing from the scope of the present invention. Therefore, the scope of the present invention is not limited to the described embodiments, and should be defined by the following claims and their equivalents.

DESCRIPTION OF REFERENCE NUMBERS

100: energy management system
110: setting server
120: controller
200: user terminal
210: web browser

What is claimed is:

1. A method for initial setup of an energy storage system when installing the energy storage system, the method comprising:
   connecting an energy management system and a user terminal with a USB cable;
   activating, by the user terminal, a USB network interface through USB tethering for initial setup;
   allocating, by the energy management system, a preset static internet protocol (IP) address to the USB network interface;
   accessing, by the user terminal, a setting server of the energy management system using the static IP address;
   performing, by the user terminal, initial setup of the energy storage system in the setting server; and
   setting, by the energy management system, different static IP addresses according to an operating system of the user terminal,
   wherein the allocating the static IP address comprises selectively allocating, by the energy management system, the different static IP addresses to different USB network interfaces.

2. The method of claim 1, wherein the accessing the setting server comprises accessing the setting server by inputting the static IP address to an address bar of a web browser of the user terminal.

3. The method of claim 1, further comprising, before performing the initial setup, providing, by the setting server, an interface for performing the initial setup to the user terminal.

4. The method of claim 1, wherein the accessing the setting server comprises accessing, by the user terminal, the setting server with the static IP address suitable for the operating system of the user terminal.

5. A system for initial setup of an energy storage system, comprising:
   an energy management system comprising a setting server configured to perform initial setup when installing the energy storage system, and a controller configured to allocate a preset static internet protocol (IP) address to a USB network interface for initial setup; and
   a user terminal connected to the energy management system through a USB cable and for activating the USB network interface through USB tethering;
   wherein the user terminal configured to accesses the setting server of the energy management system with the static IP address and perform initial setup of the energy storage system in the setting server,
   wherein the controller configured to set different static IP addresses according to an operating system of the user terminal,
   wherein the controller configured to selectively allocate the different static IP addresses to different USB network interfaces according to the operating system of the user terminal.

6. The system of claim 5, wherein when the static IP address is input to an address bar of a web browser of the user terminal, the user terminal is configured to access the setting server.

7. The system of claim 5, wherein the user terminal is configured to access the setting server with the static IP address suitable for the operating system of the user terminal.

* * * * *